United States Patent
Gorty et al.

(10) Patent No.: US 7,788,331 B2
(45) Date of Patent: Aug. 31, 2010

(54) SYSTEM AND METHOD OF POLLING ELECTRONIC MAILBOXES

(75) Inventors: Suryanarayana Murthy Gorty, Redmond, WA (US); Shaibal Roy, Sammamish, WA (US)

(73) Assignee: Teamon Systems, Inc., Issaquah, WA (US)

( * ) Notice: Subject to any disclaimer, the term of this patent is extended or adjusted under 35 U.S.C. 154(b) by 472 days.

(21) Appl. No.: 11/678,088

(22) Filed: Feb. 23, 2007

(65) Prior Publication Data

US 2007/0136464 A1    Jun. 14, 2007

Related U.S. Application Data

(63) Continuation of application No. 10/767,571, filed on Jan. 29, 2004, now Pat. No. 7,206,816.

(51) Int. Cl.
    *G06F 15/16* (2006.01)
(52) U.S. Cl. .................. 709/206; 709/204; 709/205; 709/224; 709/227
(58) Field of Classification Search ............ 709/204, 709/205, 206, 224, 227
    See application file for complete search history.

(56) References Cited

U.S. PATENT DOCUMENTS

| | | | | |
|---|---|---|---|---|
| 6,067,561 | A | 5/2000 | Dillon | 709/206 |
| 6,138,146 | A | 10/2000 | Moon et al. | 709/206 |
| 6,195,686 | B1 | 2/2001 | Moon et al. | 709/206 |
| 6,446,118 | B1 | 9/2002 | Gottlieb | 709/217 |
| 6,449,634 | B1 | 9/2002 | Capiel | 709/206 |
| 6,654,789 | B1 * | 11/2003 | Bliss et al. | 709/206 |
| 6,779,022 | B1 * | 8/2004 | Horstmann et al. | 709/206 |
| 2002/0026513 | A1 * | 2/2002 | Hoglund et al. | 709/227 |
| 2002/0059391 | A1 * | 5/2002 | Lincke et al. | 709/206 |
| 2002/0174194 | A1 | 11/2002 | Mooney et al. | 709/219 |
| 2003/0172118 | A1 | 9/2003 | Bilansky et al. | 709/206 |
| 2003/0182383 | A1 | 9/2003 | He | 709/206 |

(Continued)

FOREIGN PATENT DOCUMENTS

CA    2 295 517    7/2002

(Continued)

OTHER PUBLICATIONS

Reilly et al., "Java Network Programming and Distributed Computing," Mar. 25, 2002, Addison Wesley Professional, ISBN: 0-201-71037-4, Excerpt: Chapter 8.3, "Application Protocol Implementation", Retrieved from the Internet; URL:http://proquest.safaribooksonline.com/0201710374/ch08lev1sec3, 20 pages.

(Continued)

*Primary Examiner*—Jinsong Hu
(74) *Attorney, Agent, or Firm*—Allen, Dyer, Doppelt, Milbrath & Gilchrist, P.A.

(57) ABSTRACT

A communications system includes a polling agent that can be part of a mobile office platform for polling an electronic mailbox to retrieve unique identifiers (UID's) of electronic messages. A database stores the UID's resulting from the polling operation. The polling agent is operative for polling the electronic mailbox and retrieving only those UID's that are newer than the UID's from a previous polling to determine that new messages are available.

23 Claims, 4 Drawing Sheets

U.S. PATENT DOCUMENTS

| | | | |
|---|---|---|---|
| 2004/0244007 A1 | 12/2004 | Garza et al. | 718/105 |
| 2005/0038859 A1* | 2/2005 | Gardner et al. | 709/206 |
| 2005/0039048 A1* | 2/2005 | Tosey | 713/201 |

FOREIGN PATENT DOCUMENTS

| | | |
|---|---|---|
| EP | 1 030 508 | 8/2000 |
| EP | 1 107 541 | 6/2001 |
| WO | 02/21777 | 3/2002 |
| WO | 2005/015860 | 2/2005 |

OTHER PUBLICATIONS

Grundgeiger, "CDO & MAPI Programming with Visual Basic," Oct. 2000, O'Reilly, XP007903602, ISBN: 1-56592-665-X, Excerpt: Appendix A.6, "Retrieving Email", Retrieved from the Internet: URL:http://proquest.safaribooksonline.com/156592665X/cdomapi-APP-A-SECT-6, 3 pages.

* cited by examiner

SYSTEM AND METHOD OF POLLING ELECTRONIC MAILBOXES

CROSS-REFERENCE TO RELATED APPLICATION

This application is a continuation of Ser. No. 10/767,571 filed Jan. 29, 2004, now U.S. Pat. No. 7,206,816 issued Apr. 17, 2007, the disclosure of which is hereby incorporated by reference in its entirety.

FIELD OF THE INVENTION

The present invention relates generally to electronic mail systems, and more particularly, the present invention relates to polling electronic mailboxes and retrieving and saving unique identifiers (UID's) of electronic messages.

BACKGROUND OF THE INVENTION

Consumers have a wide variety of email providers to choose from today. These providers use web-based email applications apart from standard protocols, such as POP and IMAP. Some software vendors write applications that provide the consumer with easier accessibility to their email. Some applications reside on a user's desktop and provide users with notifications whenever new email arrives, possibly retrieving the email. Other applications provide alternate access to their email from mobile and similar devices.

Several of the email applications require that the system determine when there is new mail for the user. Some providers (such as Exchange) inherently provide a system for email notification when there is new mail, but most of them do not provide for such notification.

The email applications often use inefficient systems and methods to retrieve new email for the user. Some applications periodically retrieve a list of current messages (polling) and compare this list from this new poll with the list from the previous poll to identify new messages. For example, in the Post Office Protocol (POP), applications store the result of a unique identifier listing (UIDL) command in a poll. In the next poll, the application compares the new UIDL results with the old list to obtain the list of new messages. This can become very inefficient if any user has a large number of messages on the mail server.

This problem is made worse for email applications trying to provide these services for web-based email providers that typically present only a partial view of the messages in one page. For every poll, the applications have to "fire" or deliver several web requests, each request retrieving only one set of the messages. This can become very inefficient. These periodic polls often result in no mail retrieval as there is no new mail present in the mailbox. Retrieving all the unique identifiers (UID's) frequently only to find that there is no new mail is inefficient.

Some systems poll a user's mailbox about every 15 minutes. During the day, most polls come back empty. With current protocols, a polling engine must retrieve the entire list every time it polls the mailbox. For users with over a 1,000 emails in the mailbox, there are tremendous inefficiencies. For each mail protocol, a "connector" exists with appropriate algorithms that access the mailbox, list mail messages, and determine the number of emails.

For POP, this is relatively simple. STAT lists the number of email items and a UIDL provides information for all emails or a specified email. For web-based email not using the http mail protocol, a connector retrieves the web page listing the mail, parses through the html source, and extracts message information. In essence, the connector goes through the same steps that a user would go through to access the mailbox. The connector knows what http address is sent to retrieve the mail listing, and the connector knows the keywords that indicate where the message information is located. Since the mail listing is usually limited to a few items (e.g., 20 emails), the connector sends another web request to display the next page (i.e., the next 20 emails).

For iNotes, as an example, the access method is similar to web mail, and the connector sends out an http request to list mail, and the iNotes server returns data in XML. This makes it easier for the connector to extract mail data since it is more standardized than in web mail. Web mail can also be used in a plurality of protocols: XML, http mail or straight html.

Retrieving this web mail or POP mail can be grossly inefficient. A new polling system and method is required to minimize the time taken to poll. Well-designed protocols like IMAP or Exchange address this directly by allowing people to list only a subset of the emails in a mailbox. This is not the case, however, for POP or web mail.

SUMMARY OF THE INVENTION

The present invention is advantageous and makes polling more efficient and retrieves only those UID's that are newer than the UID's from a previous poll. The system and method of the present invention can be invoked when the number of emails in an electronic mailbox exceeds a certain threshold. For example, in POP, if the result of a STAT command exceeds a threshold, then the system and method of the present invention can be invoked.

In accordance with the present invention, a communication system and method of polling electronic mailboxes is disclosed. A polling agent polls an electronic mailbox to retrieve unique identifiers (UID's) of electronic messages. A database stores the UID's resulting from the polling operation. The polling agent is operative for polling the electronic mailbox and retrieving only those UID's that are newer than the UID's obtained from a previous polling to determine that new messages are available. In one aspect of the present invention, the polling agent is part of a mobile office platform that is operative with a mail user agent, for example, as part of a wireless communications device. The mobile office platform accesses one or more electronic mailboxes of the mail user agent using a plurality of protocol specific connectors.

In another aspect of the present invention, the mail user agent is operative for accessing the mobile office platform using a POP, IMAP, or web mail protocol. A plurality of protocol specific connectors can include a POP connector for accessing POP mailboxes, an IMAP connector for accessing IMAP mailboxes, or a connector for accessing mail from an exchange server. The polling agent is also operative for issuing a single command for obtaining the total number of electronic messages. The polling agent is also operative for issuing a STAT command for obtaining the total number of electronic messages.

In another aspect of the present invention, the polling agent is operative for retrieving a web page that contains a list of most recent messages retrieved within the electronic mailbox. The polling agent is also operative for shortening a polling interval of an electronic mailbox when there is recent activity within an electronic mailbox to provide electronic mail to a user in near real-time. The polling agent is also operative for issuing a command for a unique identifier listing (UIDL) to determine the UID's of messages on a mail server.

A method of the present invention is also disclosed and comprises the step of polling an electronic mailbox to retrieve unique identifiers (UID's) of electronic messages, and retrieving only those UID's that are newer than the UID's from a previous polling to determine that new messages are available.

In yet another aspect of the present invention, the method of polling electronic mailboxes comprises the steps of retrieving a web page that contains a list of most recent messages received within an electronic mailbox; storing the unique identifiers (UID's) starting with the most recent messages stored within the list; and storing the UID's until a UID is seen that was retrieved within a previous poll indicative that all UID's stored in the current poll are from new messages. A new web page can be requested if the previously stored UID is not present in the first web page. It is also possible to cease to obtain a new web page when a UID is seen that was stored from a previous poll.

In yet another aspect of the present invention, the method of polling electronic mailboxes comprises the steps of polling an electronic mailbox by issuing a command to retrieve the current number of messages located on a mail server and retrieving the unique identifier (UID) of the most recent message; and checking if the UID of the most recent message is in a list of stored UID's obtained from previous polls.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

The present invention advantageously overcomes the disadvantages of the prior art that was limited to an inefficient system and method for retrieving new mail for a user in which the system periodically retrieved a list of current messages used in polling and compared the list from the new poll with a list from the last poll to identify the new messages. This slowed device operation because users obtained a vast number of messages on the server. With mobile devices such as a PDA, Blackberry or other wireless device, this would be inefficient. For example, in POP, applications store the result of a UIDL command in a poll and in the next poll, the systems compare the new UIDL results with the old list to obtain a list of new messages.

The present invention invokes the enhanced polling, for example, if the number of emails in a mailbox exceeds a certain threshold. For example, in POP, if the result of a STAT command exceeds a threshold, then the system and method of the present invention is invoked.

The present invention makes polling more efficient and retrieves only UID's that are newer than the UID's from a previous poll. Different variations of the system and method of the present invention can be used for different protocols, for example, one variation could be for web-based email solutions and the other variation could be for POP systems.

Figure 1:
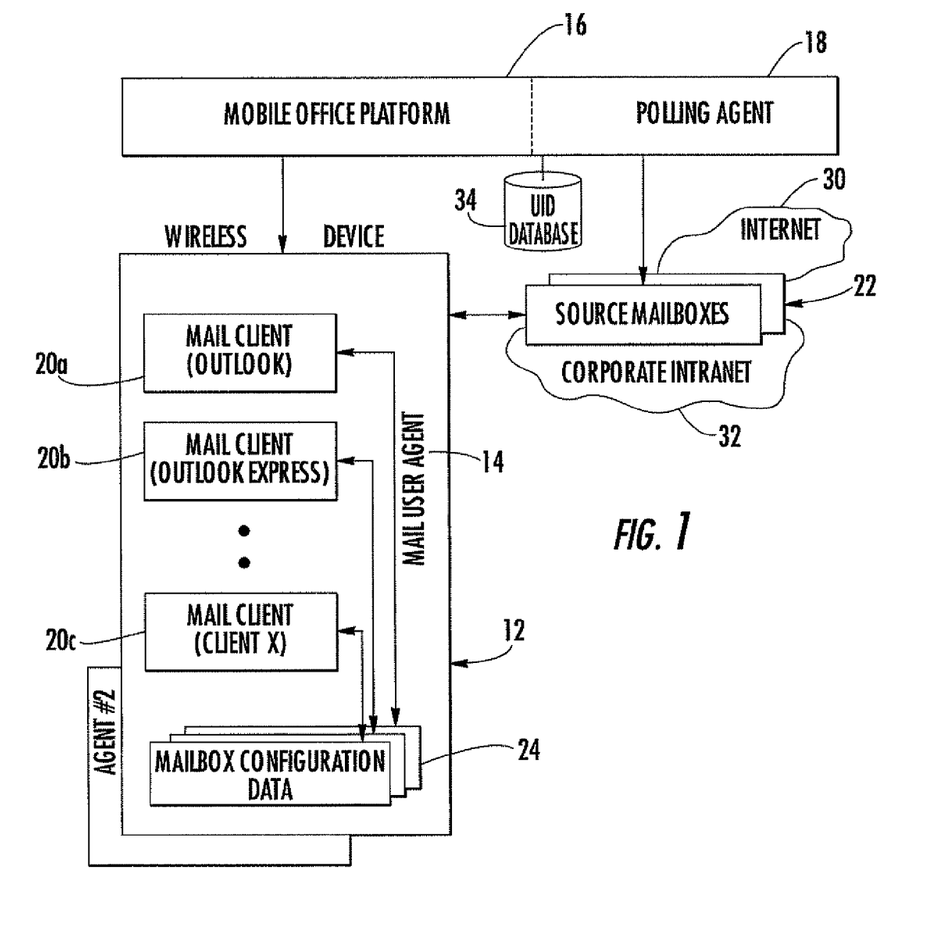
FIG. 1 is a high level block diagram of a system that includes a mobile office platform and polling agent operative with a mail user agent as part of a wireless device, for example, such that the polling agent polls source mailboxes to obtain UID's that are stored in a database.

FIG. 1 shows a high-level block diagram of basic communications system 10 used for polling electronic mailboxes and showing an example of the type of functional components that can be used in the present invention. As illustrated, a wireless device 12, such as a hand-held Blackberry unit, includes a mail user agent 14 operative with a server as a mobile office platform 16, in one aspect of the present invention. The wireless device is only one example of a user system. Other systems, including a personal computer or other device, are also operable with the present invention. The mobile office platform 16 acts as a mailbox interface module and includes a polling agent 18 and communicates with source mailboxes 20. The wireless device 12 as a mail user agent 14 could include various email clients, which in this example correspond to an Outlook mail client 20a, an Outlook Express mail client 20b, and a proprietary mail client 20a for client X, each associated with respective source mailboxes 22. The mail user agent 14 could also include mailbox configuration data 24 for each of the email clients. It should be understood that the various email clients could be located on different agent systems as part of one or more wireless devices, as illustrated by the second agent system 26, each having a mail user agent.

The mail user agent 14 is operative with the mobile office platform acting 16 as an agent for the wireless device to the source mailboxes. The source mailboxes 22 could be located on the internet 30, a corporate internet 32, or both. The mobile office platform 16 acts as an agent, performs various functions, and includes various functional and validator modules. It should also be understood that some of the functions of the mobile office platform as an agent could also be downloaded to the user system and operative by the user, as when inputting information into a mobile device or home computer.

As illustrated, the polling agent 18 is operative with a UID database 34 in which the UID's are stored, for example, typically starting with the most recent message in a list, as will be explained below.

It should be understood that the software and programming used for the present invention can vary, and different applications can be used. The mobile office platform 16 can use web services technology and include different application services used by those skilled in the art. Web services could include a combination of programming and data, which are available from a web server for web users, or the use of other web-connected programs as provided by an application service provider. Web services could use an extensible mark-up language (XML) as a standard for formatting data to be communicated.

Any type of arrangement can be used to access the mobile office platform 16, including a peer-to-peer arrangement, a central server, or other architecture and line or wireless communications. Also, middleware could be used. Data formats could be standardized and data exchanged using the extensive mark-up language (XML), which is a foundation for the web services description language (WSDL). Different web servers could be used, including the open source Apache or Microsoft's internet information server (IIS). Other web services could include Novel's web server for users of its netware operating system or the IBM family of Lotus domino service, for example, for IMB's OS/390 and AS/400 customers. Naturally, any web server should be able to download requests for file transfer protocol (FTP) files in a preferred embodiment.

The mobile office platform 16 can have various import agents that are designed to retrieve configuration data from email clients, including Eudora and Netscape besides the Outlook and Outlook Express email clients as illustrated. The mobile office platform could include a Messaging Application Programming Interface (MAPI) to retrieve any configuration data for a MAPI-compliant email client. MAPI provides the application programming interface (API) to ensure system independence for messaging applications. A layer of functionality could be provided between applications at any underlying messaging systems and act as messaging middleware. MAPI-compliant applications could communicate through a MAPI subsystem to MAPI service providers that perform requested actions for clients and pass data back through a MAPI system to a MAPI client. Any mailbox configuration data could reside in a configuration registry of the user system. In other example embodiments, data could reside in email client specific configuration storage.

In the user system, the Microsoft Outlook Express mail client can access source mailboxes that use the Post Office Protocol (POP) or Internet Mail Access Protocol (IMAP). POP, of course, is the internet mail server protocol that provides incoming message storage. The more recent protocol is POP3. POP is operative with a Simple Mail Transfer Protocol (SMTP). Any mail server could run both protocols if it is to receive, store and forward messages. The SMTP protocol exchanges messages from one mail server to another and hands messages to the required POP server for an email mailbox. A POP server can receive a message and hold it until another POP server is available. The IMAP version 4 also uses the SMTP transport mechanism, but it is a more flexible protocol because IMAP allows users to store mail on a mail server without downloading all new messages to a local machine. Internet mail service, of course, run SMTP and either POP or IMAP and receives incoming messages from any source without identity checking. Thus, mail can be selectively downloaded and read, message headers reviewed, hierarchical message stores built, an address book supported, and documents linked, authenticated and searched.

The mobile office platform could generate configuration data objects and format data objects using an extensible mark-up language (XML) for submission to various XML-compliant web services. The server and/or web service could be a simple object access protocol (SOAP) compliant service.

XML, of course, as an extensive mark-up language, is a subset of the standard generalized mark-up language (SGML) and would allow data to be stored and published on websites and be richer in presentation. Custom tags could be created to define the content of documents. Common information formats could be created and the format and data shared on the internet, corporate internets and/or other networks. The mark-up symbols in XML could be unlimited and self-defining. The channel definition format (CDF) could describe any channel and a specific CDF file can contain data that specifies an initial web page and how it can be updated.

SOAP allows one program running in one kind of operating system to communicate with the program in the same or another type of operating system by using HTTP and XML for information exchange. SOAP could specify how to encode an HTTP header in an XML file, thus, allowing one computer to call a program in another computer and pass data, while also dictating how it can return a response. SOAP is advantageous to allow data to pass through firewall servers that screen-out requests other than those for known applications to a designated port. SOAP is an XML-based protocol that has at least three parts, including: (a) an envelope to define a framework for describing what is in a message; (b) a set of encoding rules for expressing application-defined data types; and (c) a convention for representing remote procedure calls and responses.

The mobile office platform 16 could include software that is implemented as an ActiveX control as a component object model (COM) and provide a framework for building software components that communicate with each other. ActiveX controls could be automatically downloaded and executed by a web browser. Distributed object applications could be built in active web pages and ActiveX controls could be downloaded to different browsers and clients. ActiveX controls could be held in a web browser as a container and distributed over an internet or corporate intranet. ActiveX controls could also manage and update web content and client systems and work closely with a user interface of a targeted operating system. Java applets or similar component objects could also be used instead of ActiveX controls. It should be understood for purposes of the present invention that an object model control could also be any type of dynamic link library (DLL) module that runs in a container as an application program using a component object model program interface.

Figure 2:
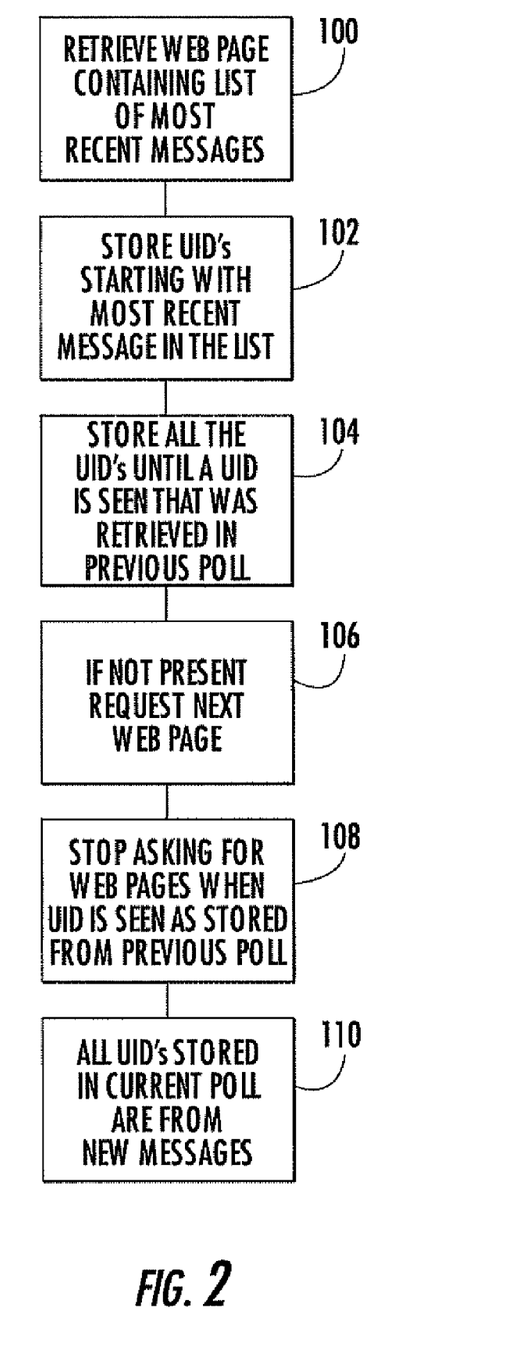
FIG. 2 is a flowchart showing an example of the algorithm used in the present invention for web-based email solutions.

FIG. 2 is a high-level block diagram showing an example of the method of the present invention and used with web-based email solutions. Reference numerals begin in the 100 series.

As shown in FIG. 2, a web page that contains a list of most recent messages can be retrieved (block 100). The UID starting with the most recent message in the list is stored (block 102). All the UID's are stored until a UID is seen that was retrieved in a previous poll (block 104).

If the previously stored UID is not present in the first web page, a request for the next web page is made (block 106). Block 102 can be repeated. Once a UID is seen that was stored from a previous poll, the system stops asking for web pages (block 108). All UID's stored in the current poll are for a new message (block 110).

Figure 3:
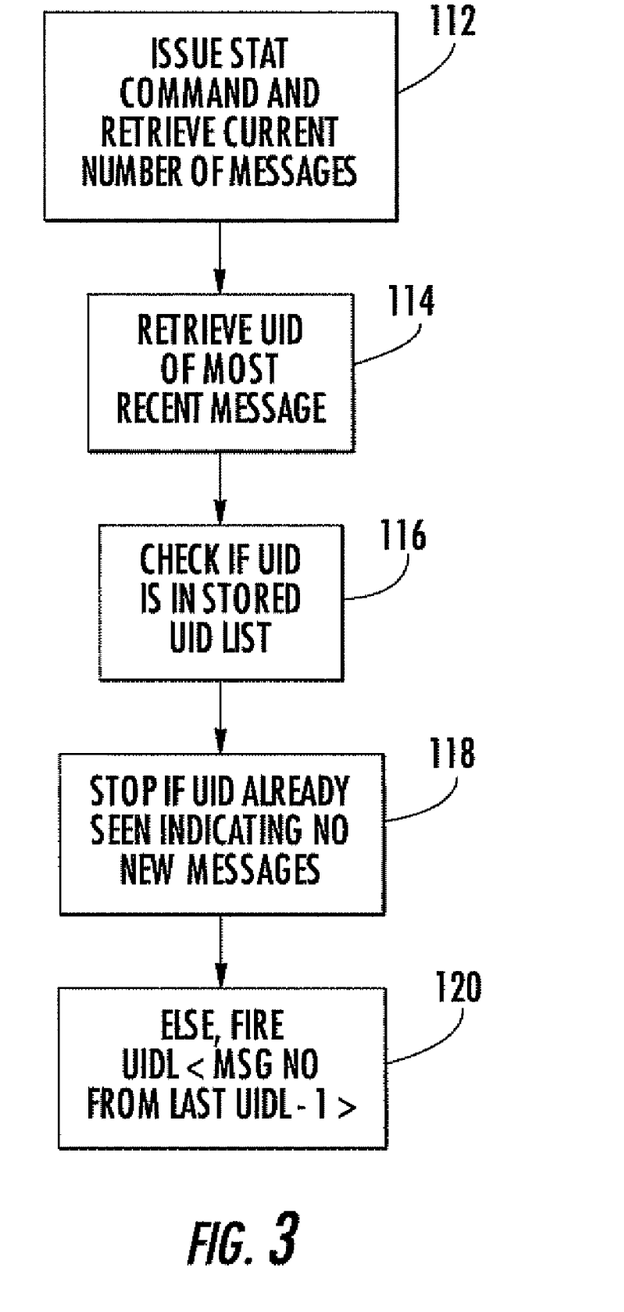
FIG. 3 is a block diagram illustrating an example of how the algorithm of the present invention can be used with the post office protocol (POP).

FIG. 3 shows an example of the algorithm of the present invention used with the post office protocol (POP). The current number of messages on the server can be retrieved, such as by a STAT command (block 112). As an example, the result could be a number of messages, X. The UID of the most recent message is retrieved (block 114) such as by a UIDL command for the number of current messages X. The system determines if the UID is in the stored UID list (block 116). The system stops if the UID is already seen because there are no new messages (block 118). If not, then the system fires UIDL<msg No from last UIDL-1> (block 120). It is possible to return to block 116. The process continues by checking if the UID is in the stored UID list.

It should be understood that there are variations of the algorithm that can be used when deemed necessary for a particular provider or email protocol. For example, the current message count from the server can be compared to the number of UID's stored from the previous poll. Only when the new message count is more can it be considered that there are new messages. This will not be effective if messages are deleted from the mailbox and they equal the number of new messages in the mailbox. A regular inefficient polling is done far less periodically. This is because the efficient polling mechanism retrieves only the new messages in the mailbox and does not delete UID's from its stored list for messages that are deleted from the user's mailbox. This less frequency regular polling helps to maintain the mailbox view concurrent.

A slightly modified version of the above protocol can be deployed in applications that only need to notify a user for the presence of new mail in his mailbox. Such applications do not need to retrieve the mail, and hence, deviate from the algorithm as soon as they detect the presence of new mail.

An exemplary hand-held mobile wireless communications device 1000 that can be used in the present invention is further described in the example below with reference to FIG. 4. The device 1000 includes a housing 1200, a keyboard 1400 and an output device 1600. The output device shown is a display 1600, which is preferably a full graphic LCD. Other types of output devices may alternatively be utilized. A processing device 1800 is contained within the housing 1200 and is coupled between the keyboard 1400 and the display 1600. The processing device 1800 controls the operation of the display 1600, as well as the overall operation of the mobile device 1000, in response to actuation of keys on the keyboard 1400 by the user.

The housing 1200 may be elongated vertically, or may take on other sizes and shapes (including clamshell housing structures). The keyboard may include a mode selection key, or other hardware or software for switching between text entry and telephony entry.

Figure 4:
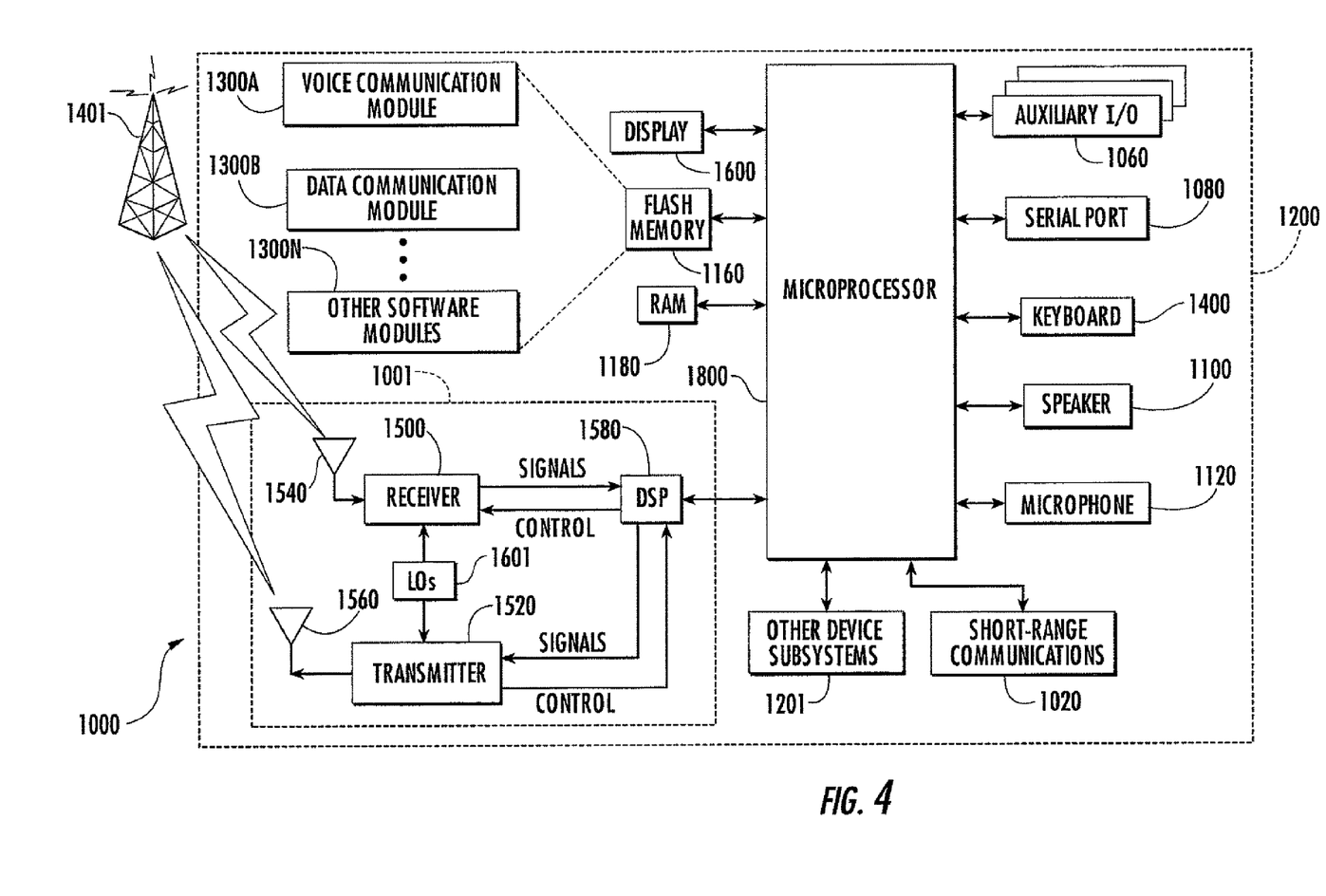
FIG. 4 is a schematic block diagram illustrating an exemplary mobile wireless communications device for use in the present invention.

In addition to the processing device 1800, other parts of the mobile device 1000 are shown schematically in FIG. 4. These include a communications subsystem 1001; a short-range communications subsystem 1020; the keyboard 1400 and the display 1600, along with other input/output devices 1060, 1080, 1100 and 1120; as well as memory devices 1160, 1180 and various other device subsystems 1201. The mobile device 1000 is preferably a two-way RF communications device having voice and data communications capabilities. In addition, the mobile device 1000 preferably has the capability to communicate with other computer systems via the Internet.

Operating system software executed by the processing device 1800 is preferably stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 1401. Preferably, the PIM data items are seamlessly integrated, synchronized and updated via the wireless network 1401 with the device user's corresponding data items stored or associated with a host computer system. Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, PCS, GSM, etc. Other types of data and voice networks, both separate and integrated, may also be utilized with the mobile device 1000.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keyboard 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A communications system comprising:
   a database for storing unique identifiers (UID's) resulting from a polling operation; and
   a polling agent operative for determining a total number of electronic messages on a mail server and comparing to a threshold such that if the threshold is exceeded, the polling agent polls the electronic mailbox and retrieves UID's that are newer than the UID's from a previous polling to determine that new messages are available, said polling agent also operative for shortening a polling interval of the electronic mailbox when there is recent activity within the electronic mailbox to provide electronic mail to a user in near real-time.

2. A communications system according to claim 1, wherein said polling agent is operative for retrieving a webpage that contains a list of most recent messages retrieved within the electronic mailbox.

3. A communications system according to claim 1, wherein said polling agent is operative for issuing a command for a unique identifier listing (UIDL) to determine the UID's of messages on the mail server.

4. A communications system according to claim 1, wherein said polling agent is operative for checking if the retrieved UID of the most recent message is contained within said database as indicative that no new messages have been received.

5. A communications system according to claim 1, wherein said database and polling agent cooperate for storing the UID's for a plurality of source electronic mailboxes.

6. A communications system according to claim 1, wherein said polling agent is operative to retrieve a message only when the UID is determined to be newer than the UID's from a previous polling.

7. A communications system according to claim 1, wherein said polling agent is operative to determine a current message count from a mail server and compare the current message count to the number of UID's stored from a previous poll and consider that there are new are messages when the new message count is more.

8. A method of polling electronic mailboxes comprising the steps of:
   polling an electronic mailbox to retrieve unique identifiers (UID's) of electronic messages and storing the unique UID's in a database; and
   determining a total number of electronic messages on a mail server and comparing to a threshold such that if the threshold is exceeded, retrieving only those UID's that are newer than the UID's from a previous polling to determine that new messages are available, and shortening the polling interval of the electronic mailbox when there is recent activity within the electronic mailbox to provide electronic mail to a user in near real-time.

9. A method according to claim 8, wherein the step of polling further comprises the step of issuing a unique identifier listing (UIDL) command.

10. A method according to claim 8, wherein the step of polling further comprises the step of retrieving the UID of the most recent message received on a mail server.

11. A method according to claim 8, and further comprising the step of checking if the retrieved UID of the most recent message is contained within a database of UID's obtained from previous polls as indicative that no new messages have been received.

12. A method according to claim 8, and further comprising the step of storing within a database a record of the UID's.

13. A method according to claim 8, and further comprising the step of storing the UID for a plurality of source electronic mailboxes.

14. A method according to claim 8, and further comprising the step of retrieving a message only when the UID is determined to be newer than the UID's from a previous polling.

15. A method according to claim 8, and further comprising the step of determining a current message count from a mail server and comparing the current message count to the number of UID's stored from a previous poll and considering that there are new messages when the new message count is more.

16. A tangible computer readable storage medium having stored thereon instructions for polling electronic mailboxes, that when executed, perform steps comprising:
   polling an electronic mailbox to retrieve unique identifiers (UID's) of electronic messages; and
   determining a total number of electronic messages on a mail server and comparing to a threshold such that if the threshold is exceeded, retrieving only those UID's that are newer than the UID's from a previous polling to determine that new messages are available, and shortening the polling interval of the electronic mailbox when there is recent activity within the electronic mailbox to provide electronic mail to a user in near real-time.

17. A tangible computer readable storage medium according to claim 16, wherein the step of polling further comprises the step of issuing a unique identifier listing (UIDL) command.

18. A tangible computer readable storage medium according to claim 16, wherein the step of polling further comprises the step of retrieving the UID of the most recent message received on a mail server.

19. A tangible computer readable storage medium according to claim 16, and further comprising the step of checking if the retrieved UID of the most recent message is contained within a database of UID's obtained from previous polls as indicative that no new messages have been received.

20. A tangible computer readable storage medium according to claim 16, and further comprising the step of storing within a database a record of the UID's.

21. A tangible computer readable storage medium according to claim 16, and further comprising the step of storing the UID for a plurality of source electronic mailboxes.

22. A tangible computer readable storage medium according to claim 16, and further comprising the step of retrieving a message only when the UID is determined to be newer than the UID's from a previous polling.

23. A tangible computer readable storage medium according to claim 16, and further comprising the step of determining a current message count from a mail server and comparing the current message count to the number of UID's stored from a previous poll and considering that there are new messages when the new message count is more.

* * * * *